(12) United States Patent
Peterson

(10) Patent No.: US 12,312,050 B2
(45) Date of Patent: *May 27, 2025

(54) BRAKING SYSTEM FOR GYROSCOPIC BOAT ROLL STABILIZER

(71) Applicant: WaveTamer LLC, Greenville, NC (US)

(72) Inventor: Jeffrey Peterson, Mooresville, NC (US)

(73) Assignee: WAVETAMER LLC, Greenville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/624,362

(22) Filed: Apr. 2, 2024

(65) Prior Publication Data

US 2024/0246644 A1 Jul. 25, 2024

Related U.S. Application Data

(63) Continuation of application No. 18/385,651, filed on Oct. 31, 2023, now Pat. No. 11,964,735, which is a continuation of application No. 18/127,870, filed on Mar. 29, 2023, now Pat. No. 11,820,469, which is a continuation of application No. 17/826,860, filed on May 27, 2022, now Pat. No. 11,628,914, which is a continuation of application No. 16/832,510, filed on Mar. 27, 2020, now Pat. No. 11,440,629.

(60) Provisional application No. 62/828,845, filed on Apr. 3, 2019.

(51) Int. Cl.
*B63B 39/04* (2006.01)

(52) U.S. Cl.
CPC .................................. *B63B 39/04* (2013.01)

(58) Field of Classification Search
CPC ........ B63B 39/04; G01C 19/18; G01C 19/28; G05C 21/18; G05D 1/0875
USPC ........................................... 114/122; 74/5.22
See application file for complete search history.

(56) References Cited

U.S. PATENT DOCUMENTS

| | | | |
|---|---|---|---|
| 9,452,810 B2 * | 9/2016 | Nohara | B63B 39/04 |
| 9,586,660 B2 * | 3/2017 | Ulgen | B63B 39/04 |
| 10,036,447 B2 * | 7/2018 | Nohara | F16F 9/145 |
| 11,427,289 B2 * | 8/2022 | Smith | H02K 7/02 |
| 11,440,629 B2 * | 9/2022 | Peterson | B63B 39/04 |
| 11,591,052 B2 * | 2/2023 | Sohacki | B63J 3/04 |

* cited by examiner

*Primary Examiner* — Daniel V Venne
(74) *Attorney, Agent, or Firm* — COATS & BENNETT, PLLC

(57) ABSTRACT

A gyroscopic boat roll stabilizer for a boat comprises a gimbal, having a gimbal axis, an enclosure mounted to the gimbal and configured to precess about a gimbal axis, a flywheel assembly rotatably mounted inside the enclosure for generating a torque that is applied to counter a rolling motion of the boat, and a braking system for controlling precession of the enclosure.

15 Claims, 12 Drawing Sheets

BRAKING SYSTEM FOR GYROSCOPIC BOAT ROLL STABILIZER

RELATED APPLICATIONS

This application is a continuation of U.S. patent application Ser. No. 18/385,651 filed 31 Oct. 2023; which is a continuation of U.S. patent application Ser. No. 18/127,870, filed 29 Mar. 2023, now U.S. Pat. No. 11,830,469; which is a continuation of U.S. patent application Ser. No. 17/826, 860, filed 27 May 2022, now U.S. Pat. No. 11,628,914; which is a continuation of U.S. patent application Ser. No. 16/832,510, filed 27 Mar. 2020, now U.S. Pat. No. 11,440, 629; and claims benefit of U.S. Provisional Patent Application Ser. No. 62/828,845, filed 3 Apr. 2019; the disclosures of all of which are incorporated by reference herein in their entirety.

TECHNICAL FIELD

The present disclosure relates generally to boat roll stabilizers for reducing the sideways rolling motion of a boat and, more particularly, to an improved braking system for controlled moment gyroscopes.

BACKGROUND

The sideways rolling motion of a boat can create safety problems for passengers and crew on boats, as well as cause discomfort to passengers not accustomed to the rolling motion of the boat. A number of technologies currently exist to reduce the sideways rolling motion of a ship. One technology currently in use is active fin stabilization. Stabilizer fins are attached to the hull of the ship beneath the waterline and generate lift to reduce the roll of the ship due to wind or waves. In the case of active fin stabilization, the motion of the ship is sensed and the angle of the fin is controlled based on the motion of the ship to generate a force to counteract the roll. Fin stabilization is most commonly used on large ships and are effective when the ship is underway. Fin stabilization technology is not used frequently in smaller boats and is generally not effective when the boat is at rest. Stabilizer fins also add to the drag of the hull and are susceptible to damage.

Gyroscopic boat stabilization is another technology for roll suppression that is based on the gyroscopic effect. A control moment gyroscope (CMG) is mounted in the boat and generates a torque that can be used to counteract the rolling motion of the boat. The CMG includes a flywheel that spins at a high speed. A controller senses the attitude of the boat and uses the energy stored in the flywheel to "correct" the attitude of the boat by applying a torque to the hull counteracting the rolling motion of the boat. CMGs work not only when a boat is underway, but also when the boat is at rest. CMGs are also less expensive than stabilizer fins, do not add to the drag of the hull, and are not exposed to risk of damage.

Although CMGs are gaining in popularity, particularly for smaller fishing boats and yachts, this technology has some limitations. CMGs rely on a braking system to control the precession of the flywheel. In prior art CMGs, the design of the braking system constrains the precession of the flywheel to about +/−22 degrees, which may not be sufficient to effectively counter the rolling motion of the boat. Further, the resistance of the braking systems imposes limitations on the rate of precession, which affects the response of the CMG to the wave motion.

SUMMARY

The present disclosure relates to a gyroscopic boat roll stabilizer configured to be installed in a boat. The boat roll stabilizer comprises a gimbal, having a gimbal axis, an enclosure mounted to the gimbal and configured to precess about a gimbal axis, a flywheel assembly rotatably mounted inside the enclosure for generating a torque that is applied to counter a rolling motion of the boat, and a braking system for controlling precession of the enclosure. The braking system is configured to enable precession in the first and second directions of up to at least 45 degrees.

According to another aspect of the disclosure, the braking system comprises a first actuator connected between the support frame and the enclosure to resist precession in a first direction about the gimbal axis, and a second actuator connected between the support frame and the enclosure to resist precession in a second direction about the gimbal axis. The first actuator and the second actuator both connect to the enclosure on the same side of a transverse plane including the gimbal axis, and on different sides of a frontal plane including the gimbal axis.

According to another aspect of the disclosure, each actuator comprises a fluid cylinder and a lockout valve mounted to the fluid cylinder of the actuator. The lockout valve is movable between a locked position preventing precession of the enclosure and an unlocked position. The lockout valves are in fluid communication with the piston side of the fluid cylinders. In one embodiment, a manifold is disposed in a fluid flow path between the first and second actuators. A first port on each lockout valve is in fluid communication with the manifold, while a second port on each lockout valve is in fluid communication with the rod side of the fluid cylinder. A fluid line connects the first port of the lockout valve on the actuator to the manifold.

According to another aspect of the disclosure, a gyroscopic boat roll stabilizer configured to be installed in a boat includes a gimbal, a flywheel assembly, and a braking system. The gimbal includes a support frame and enclosure configured to precess about a gimbal axis. The flywheel assembly is rotatably mounted inside the enclosure for generating a torque that is applied to counter a rolling motion of the boat. The braking system controls precession of the enclosure, and includes a first actuator and a manifold assembly. The manifold assembly is connected in a fluid flow path to the first actuator, and the manifold assembly includes a main valve. The main valve is connected to the first actuator by a fluid line that allows fluid flow between the main valve and the first actuator. The manifold assembly further comprises an hydraulic accumulator operatively connected to the main valve on a low pressure side of the main valve. In some embodiments, the manifold assembly further comprises a second hydraulic accumulator operatively connected to the main valve on the low pressure side of the main valve, with the first accumulator associated with the first accumulator and the second accumulator associated with a second actuator.

According to another aspect of the disclosure, each of the actuators further comprises a bypass line connecting the second port of the lockout valve and configured to communicate fluid directly between the cylinder side and rod side of the fluid cylinder of the actuator without.

DETAILED DESCRIPTION

Figure 1A:
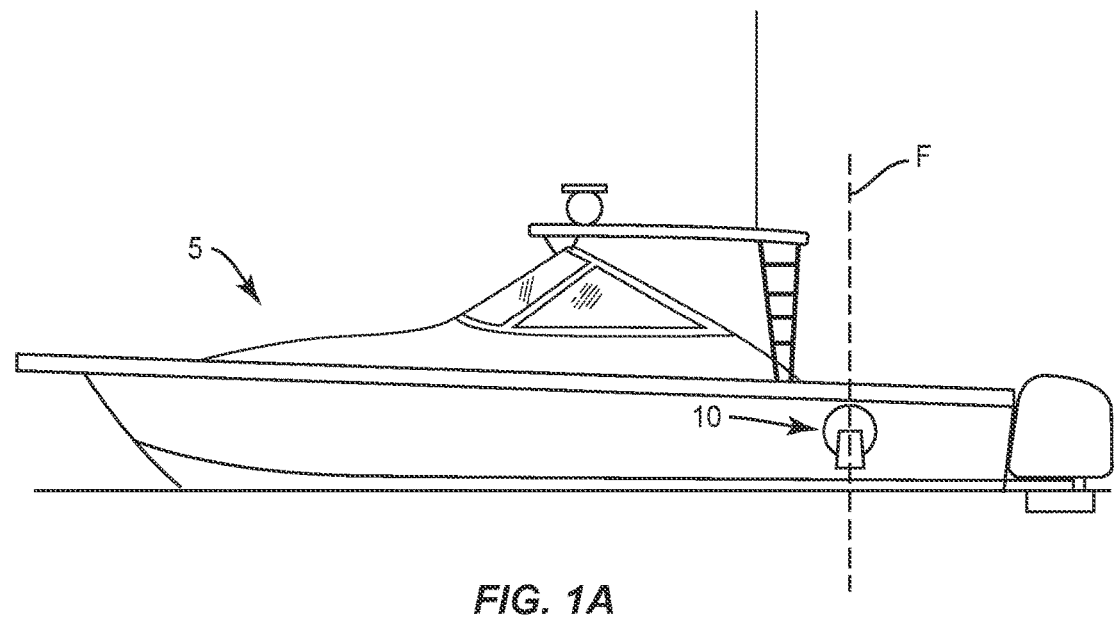
FIGS. 1A and 1B illustrate a boat equipped with a boat roll stabilizer.
Figure 1B:
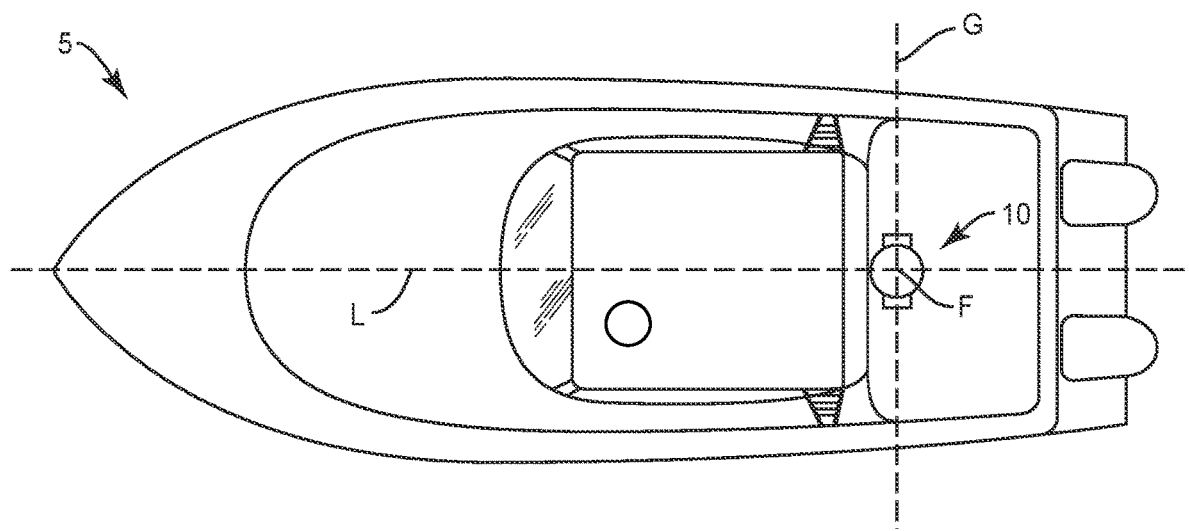
Figure 2:
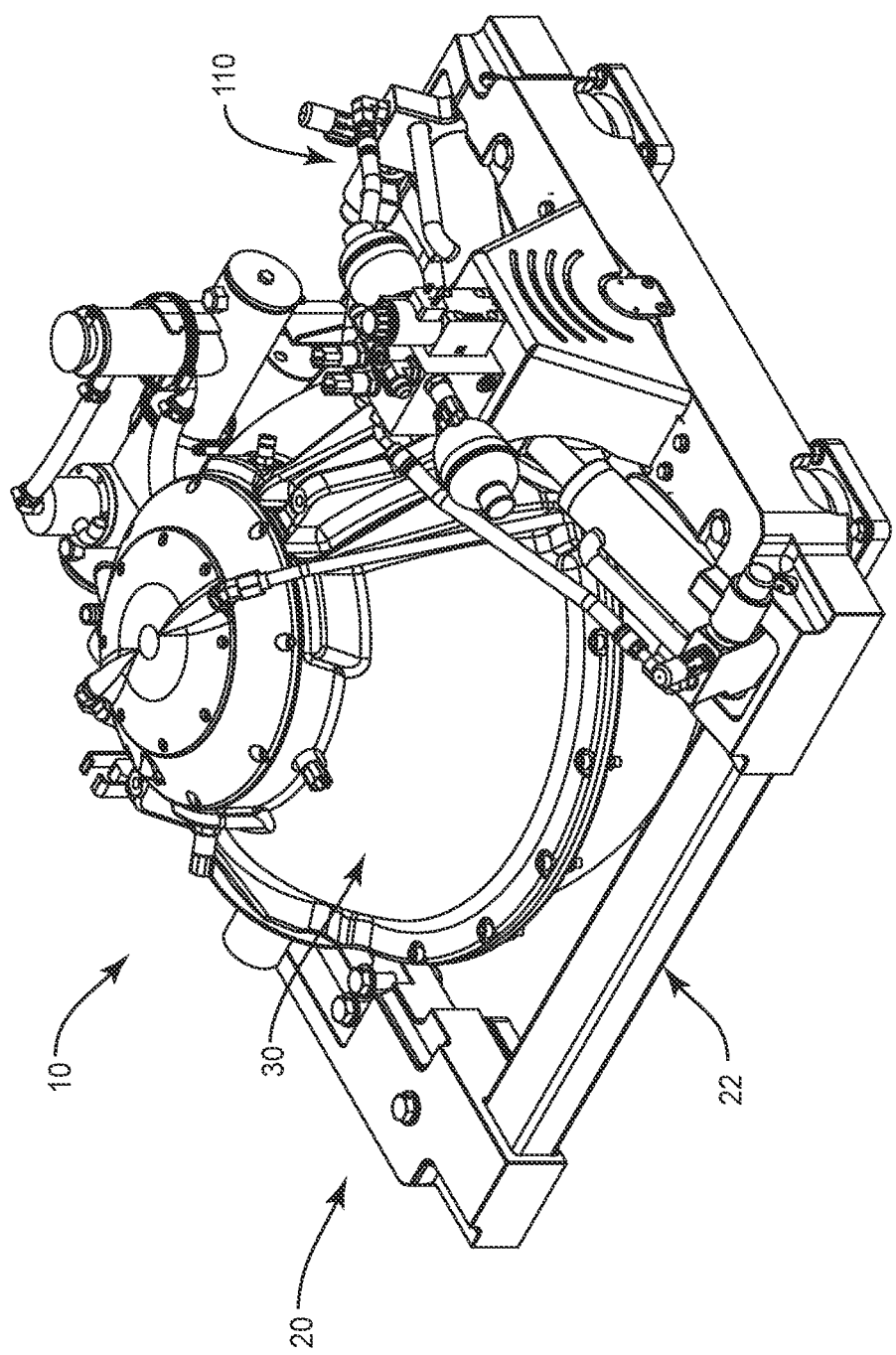
FIG. 2 is a perspective view of the boat roll stabilizer showing the gimbal and enclosure.
Figure 3:
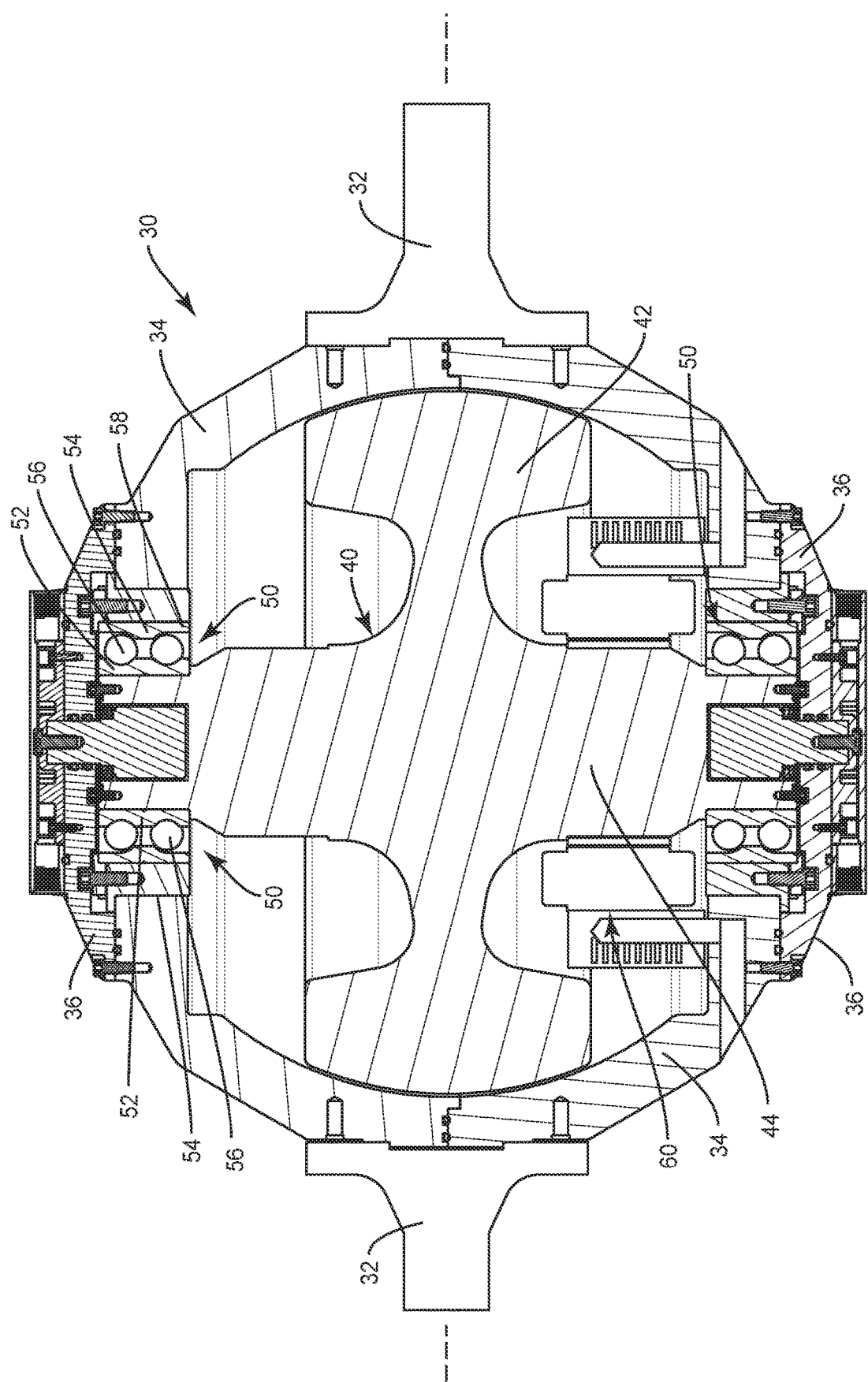
FIG. 3 is a cross section of the enclosure for the boat roll stabilizer, showing the flywheel assembly.
Figure 4:
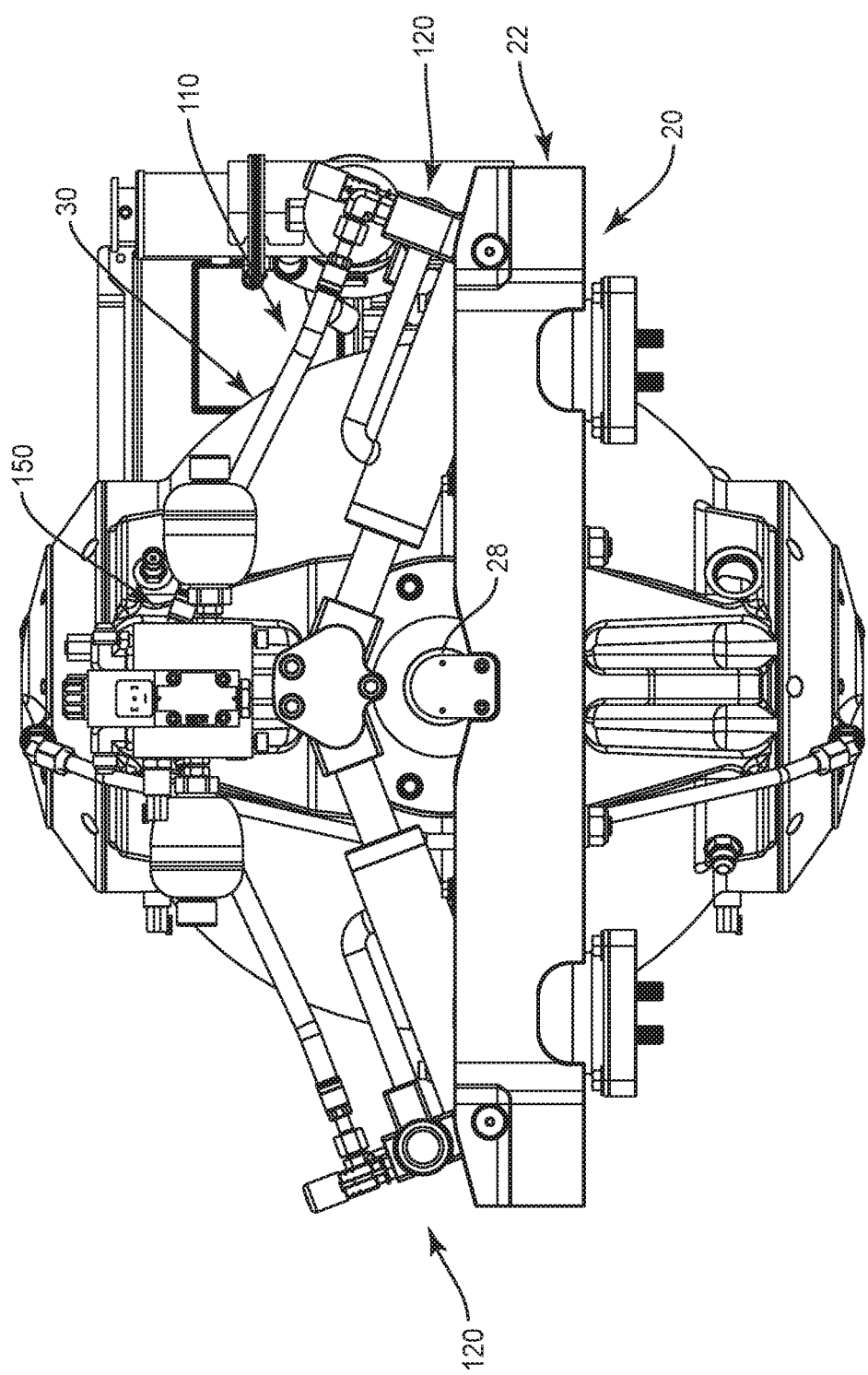
FIG. 4 is an elevation view of a boat roll stabilizer with the enclosure in a neutral or vertical position.
Figure 5:
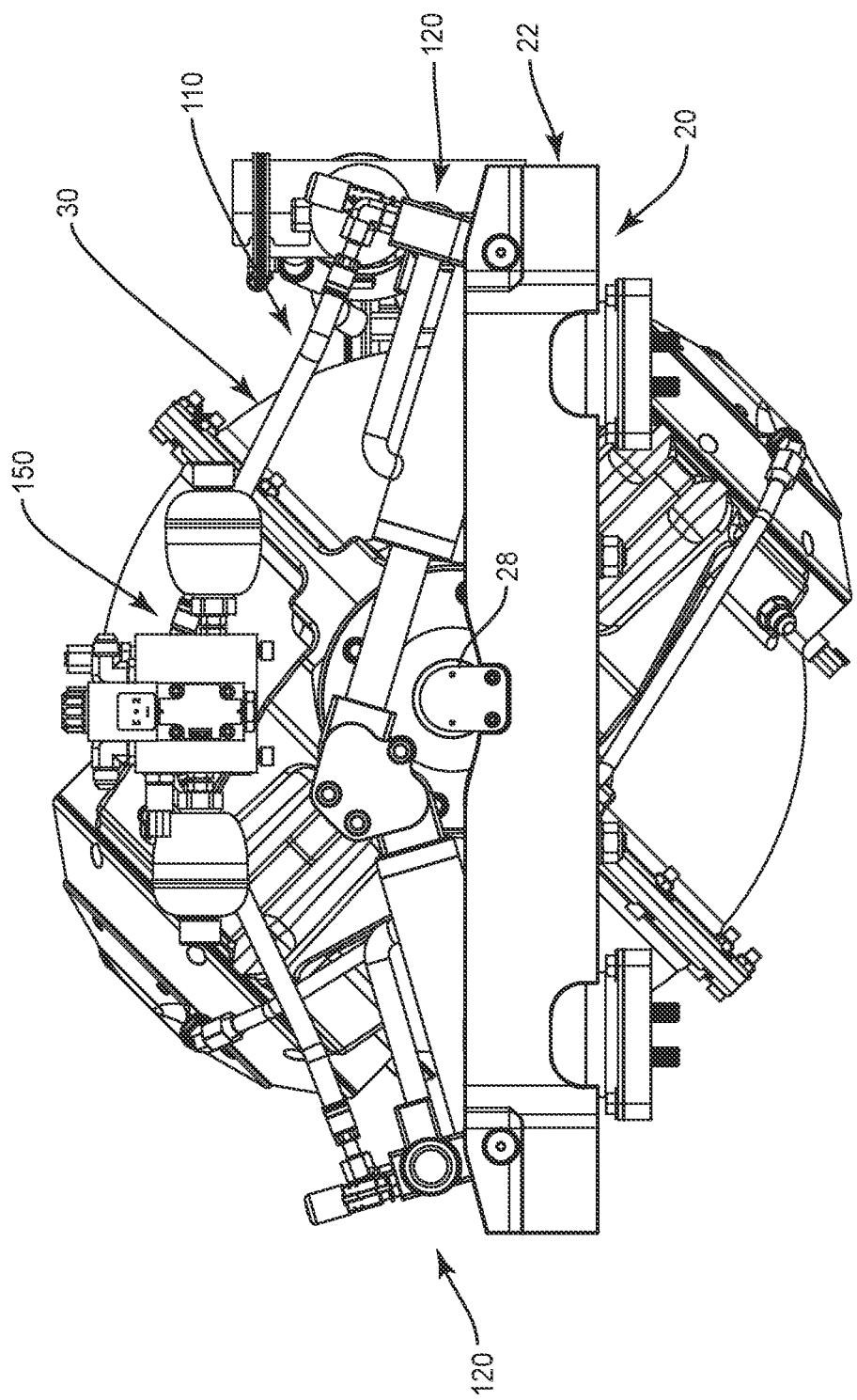
FIG. 5 is an elevation view of a boat roll stabilizer with the enclosure rotated at a 45° angle.

Referring now to the drawings, FIGS. 1A and 1B illustrate a CMG 10 mounted in a boat 5 for roll stabilization. Multiple embodiments of the CMG 10 are described. For convenience, similar reference numbers are used in the following description of the embodiments to indicate similar elements in each of the embodiments.

The main functional elements of the CMG 10 comprise a single-axis gimbal 20, an enclosure 30 mounted to the gimbal 20 for rotation about a gimbal axis, a flywheel assembly 40 mounted by bearings 50 inside the enclosure 30, a motor 60 to rotate the flywheel assembly 40, and a torque control system 100 (FIG. 6) to control precession of the flywheel 42 so that the energy of the flywheel assembly 40 is transferred to the hull of the boat 5 to counteract rolling motions.

The gimbal 20 comprises a support frame 22 that configured to be securely mounted in the boat 5. Preferably, the gimbal 20 is mounted along a longitudinal axis (LA) of the boat 5 with the gimbal axis G extending transverse to the longitudinal axis of the boat 5. Conventionally, the gimbal 20 is mounted in the hull of the boat 5, but could be mounted at any location. The enclosure 30 is rotatably mounted to the support frame 22 by spherical roller bearings 28 housed in pillow blocks so as to rotate about the gimbal axis G extending transversely across the boat 5. For this purpose, the enclosure 30 includes two gimbal shafts 32 projecting from diametrically opposed sides of the enclosure 30. The gimbal shafts 32 are received in the spherical bearings 28 to allow the enclosure 30 and flywheel assembly 40 to rotate or precess about the gimbal axis G in the fore and aft directions.

The enclosure 30 is generally spherical in form and comprises two main housing sections 34 and two cover plates 36. The two main housing section 34 join along a plane that bisects the spherical enclosure 30. The cover plates 36 join the main housing sections along respective planes closer to the "poles" of the spherical enclosure 30. All joints in the enclosure 30 are sealed to maintain a below-ambient pressure within the enclosure 30 to reduce aerodynamic drag on the flywheel assembly 40.

The flywheel assembly 40 comprises a flywheel 42 and shaft 44 that is mounted for rotation inside the enclosure 30 so that the rotational axis F of the flywheel 42 is perpendicular to the gimbal axis G. Thus, when the boat 5 is level, the rotational axis F of the flywheel shaft 44 will be in the vertical direction, i.e., perpendicular to the deck of the boat. The flywheel 42 and shaft 44 may be formed as a unitary piece, or may comprise two separate components. In one exemplary embodiment, the diameter of the flywheel 42 is approximately 20.5 inches and the flywheel assembly 40 has a total weight of about 614 lbs. The flywheel assembly 40 has a moment of inertia of about 32,273 lb in$^2$. When rotated at a rate of 9000 rpm, the angular momentum of the flywheel assembly 40 is about 211,225 lbm ft$^2$/s.

The flywheel assembly 40 is supported by upper and lower bearing assemblies inside the enclosure 30. Each bearing assembly comprises a bearing 50 mounted within a bearing block 58. Each bearing 50 comprises an inner race 52 that contacts and rotates with the flywheel shaft 44, an outer race 54 that is fixed inside the bearing block 58, and a ball 56 disposed between the inner and outer races 52, 54. The bearing blocks 58 are secured to the interior of the enclosure. Seals (not shown) are disposed on the top and bottom of the bearings 50 to contain lubricant in the bearings 50. Each end of the flywheel shaft 44 includes a cavity with a heat sink inserted therein to dissipate heat as described in U.S. Provisional Application No. 62/768,356 filed Nov. 18, 2018, which is incorporated herein in its entirety by reference.

The motor 60 rotates the flywheel assembly 40 at a high rate of speed (e.g., 9000 rpm). Although the motor 60 is shown mounted inside the enclosure 30, it is also possible to mount the motor 60 on the exterior of the enclosure 30. In one embodiment, the motor 60 comprises operates on 230 volt single phase AC power and is able to accelerate a flywheel assembly with a moment of inertia of about 32,273 lb in$^2$ flywheel from rest to a rotational speed of 9000 rpm preferably in about 30 minutes or less for an average acceleration of about 5 rpm/s, and more preferably in about 20 minutes or less for an average acceleration of about 7.75 rpm/s, and even more preferably in about 10 minutes or less for an average acceleration of about 15 rpm/s (or 1.57 radians/s$^2$).

Figure 6:
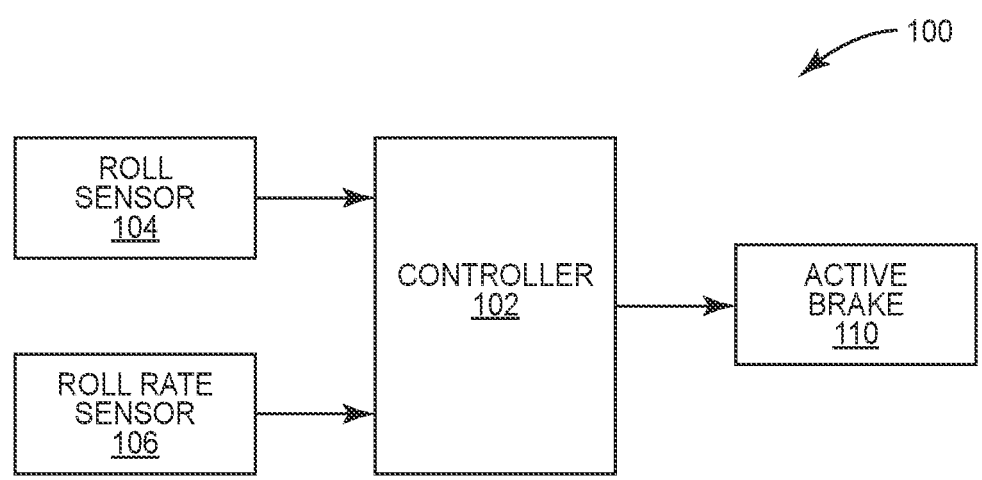
FIG. 6 is a schematic block diagram of a torque control system for the boat roll stabilizer.

The torque control system 100, shown in FIG. 6, controls the precession of the flywheel 42 about the gimbal access. The rolling motion of a boat 5 caused by wave action can be characterized by a roll angle and roll rate. The rolling motion causes the flywheel 42 to precess about the gimbal axis. Sensors 104, 106 measure the roll angle and roll rate respectively, which are fed to a controller 102. The controller 102 generates control signals to control an active braking system 110 or other torque applying device that controls the precession of the flywheel 42. By controlling the precession, the flywheel assembly 40 generates a torque to counteract the rolling motion. This torque is transferred through the gimbal 20 to the boat 5 to dampen the roll of the boat 5.

In conventional braking systems 110 for CMGs 10, the design of the braking system constrains the precession of the flywheel to about +/−22 degrees, which may not be sufficient to effectively counter the rolling motion of the boat. Further, the resistance of the braking systems 110 imposes limitations on the rate of precession, which affects the response of the CMG 10 to wave motion.

Figure 7:
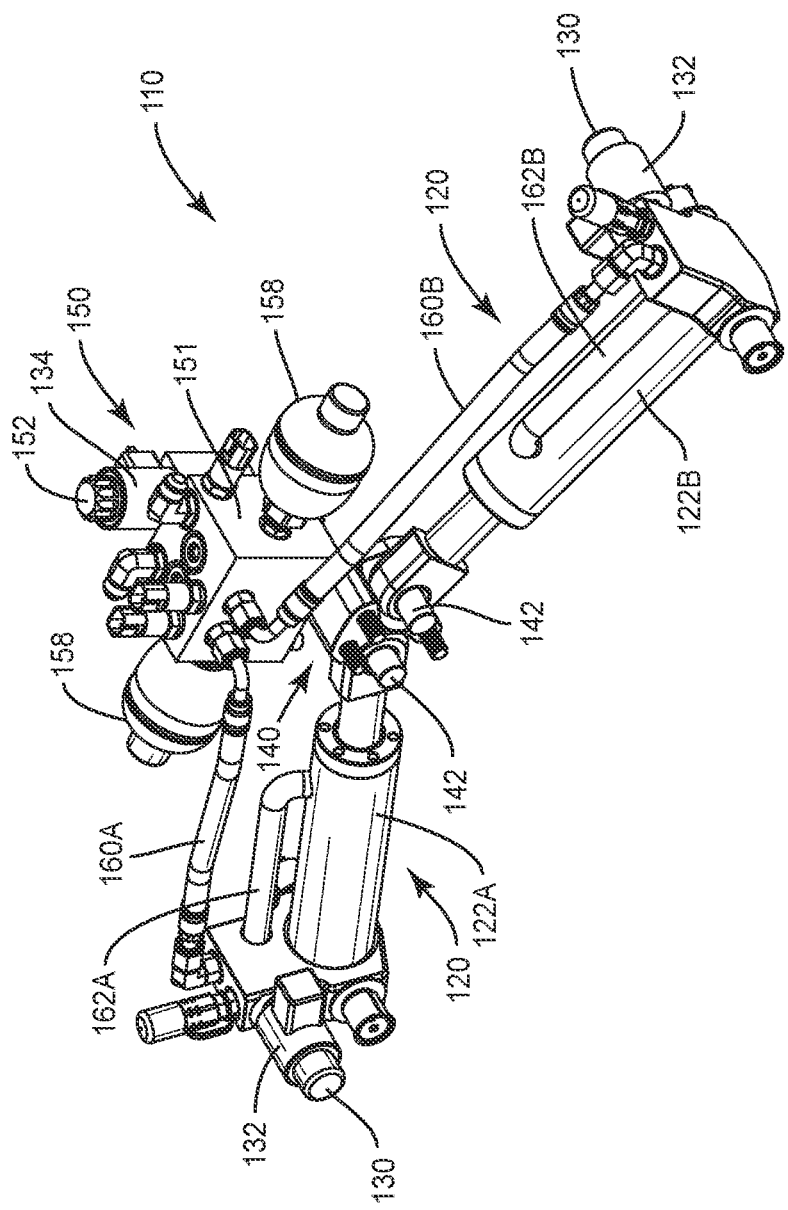
FIG. 7 is a perspective view of a braking system for a boat roll stabilizer.
Figure 8:
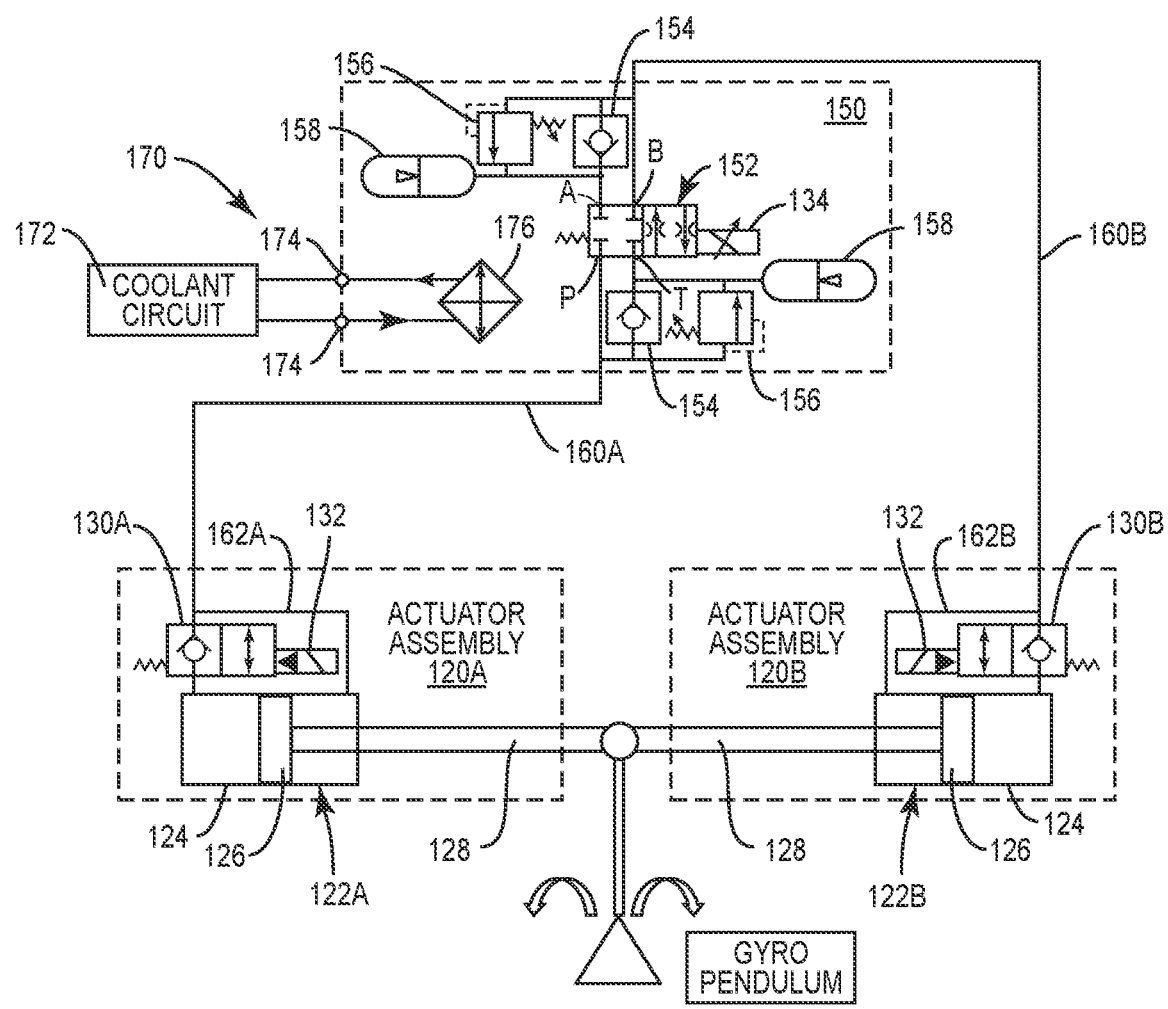
FIG. 8 a schematic diagram of a braking system for a boat roll stabilizer.

According to one aspect of the disclosure, the braking system 110 is designed to enable the flywheel 42 to precess up to about +/−45 degrees. An exemplary embodiment of the braking system 110 is shown in FIGS. 7 and 8. FIG. 7 is a reverse perspective view of the braking system 110. As seen in FIG. 7, the braking system 110 comprises a pair of actuator assemblies 120 that control the precession of the flywheel 42 about the gimbal axis, and a manifold assembly 150 for transferring fluid between the opposing cylinders 120 when the flywheel precesses. Hydraulic lines connect the fluid cylinders 120 with the manifold assembly 150 to form a closed fluid flow path between the cylinders 120.

FIG. 8 is a schematic diagram of the braking system 110. As seen in FIG. 8, the actuator assemblies 120 each comprise a fluid cylinder 122 having a housing 124, piston 126, and piston rod 128. The fluid cylinders 122 each include a piston side port and a rod side port. A lockout valve 130 is mounted on the housing 124 of the fluid cylinder 122 and is in fluid communication with the piston side port of each fluid cylinder 122. The lockout valve 130 is normally open and is closed by actuation of a solenoid 132. In one embodiment, the housing of the lockout valve 130 is secured to or integrally formed with the housing 124 of the fluid cylinder 122 to form a unitary assembly. Each fluid cylinder 122 is pivotally connected at one end to the support frame 22 and at the other end to the enclosure 30. The housing 124 of the fluid cylinder 122 pivotally connects to the support frame 22 and the piston rod 128 pivotally connects to the enclosure 30 via a connecting plate 140 (FIG. 7), although this arrangement could be revised.

The connecting plate 140, shown best in FIG. 7, bolts to the exterior of the enclosure 30 and includes two pivot pins 142 that are rotatably journaled in bushings or bearings (not shown) disposed at the end of respective piston rods 128. The connecting plate 140 is symmetrical about a frontal plane and the pivot pins 142 are offset from the frontal plane by a distance D. As used herein, the term "frontal plane" refers to a vertical plane (when the enclosure 30 is in a neutral position) that includes the gimbal axis and divides the enclosure 30 into front and back sections. The axes of the pivot pins 142 are parallel to the frontal plane. Three bolts 144 pass through corresponding openings in the connecting plate 140 and thread into threaded holes (not shown) in the enclosure 30 to secure the connecting pale 140 to the enclosure.

Due to the mechanical arrangement of the braking system 110, the enclosure 30 is able to precess up to about +/−45 degrees without any mechanical interference compared to about +/−22.5 degrees for prior art designs. The greater degree of precession enables a greater peak roll torque to be achieved.

Figure 9:
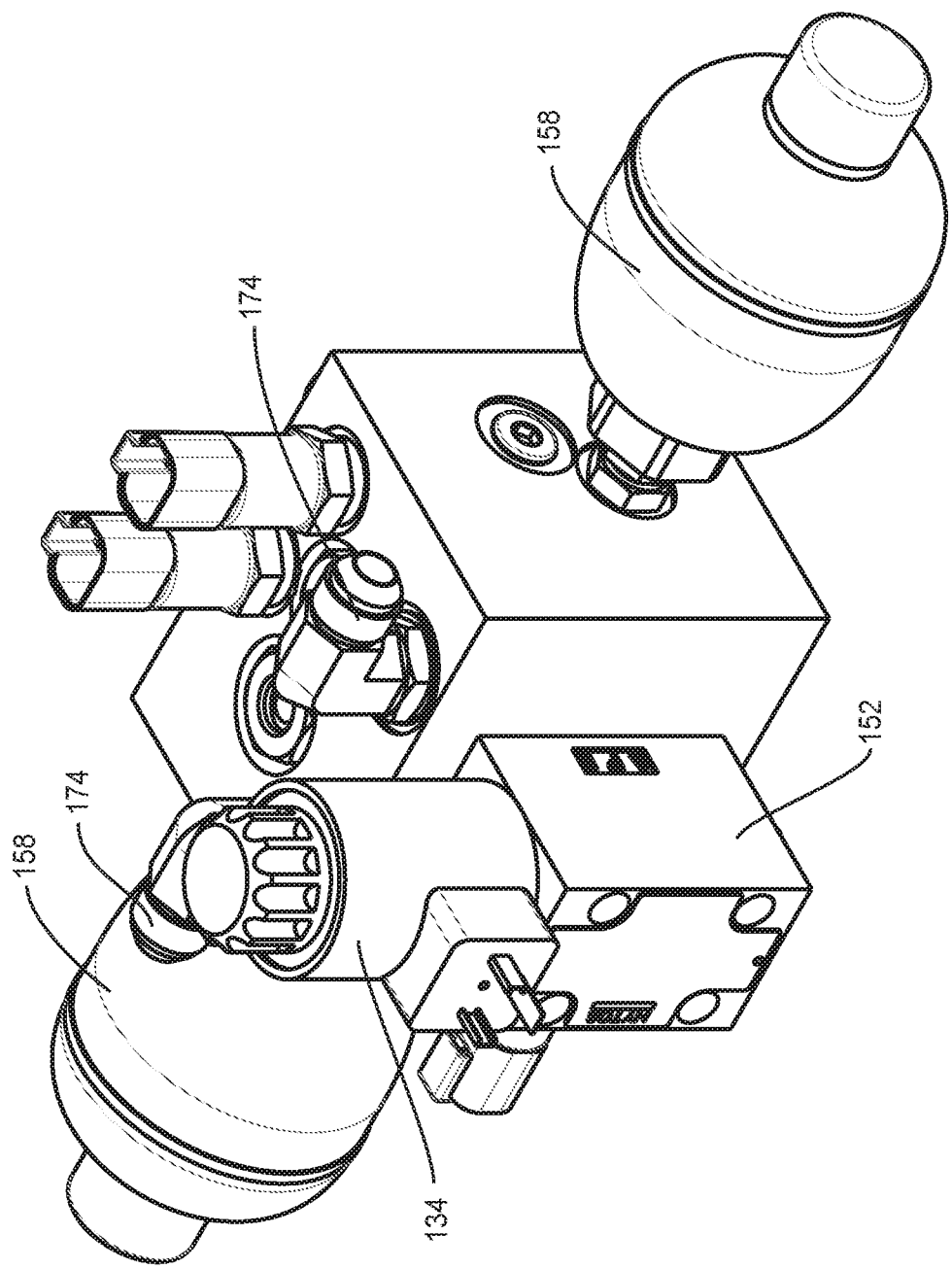
FIG. 9 is a perspective view of the manifold for the braking system.

Referring back to FIG. 8, the manifold assembly 150 comprises a main valve 152, two check valves 154, two pressure relief valves 156, and two accumulators 158. The main valve 152 is mounted to the manifold block 151 as shown in FIG. 9 and has four ports labeled A, B, P and T respectively and is controlled by a solenoid 134. Ports P and B connect via fluid lines 160A and 160B to the normally closed lockout valves 130 in actuator assemblies 120A and 120B respectively. Ports A and T connect the main valve 152 to respective accumulators 158. Fluid flowing into the main valve via port P exits via port A. Fluid flowing into the main valve 152 via port B exits via port T. The check valves 154 control the direction of the fluid flow through the main valve 152 and prevent back flow into ports A and T of the main valve 152. The pressure relief valves 156 prevent overpressurization of the fluid in the fluid components of the braking assembly 10 due to thermal expansion of fluid when the enclosure 30 is locked. The main valve 152 and lockout valves 130 are controlled by solenoids 132 and 134 respectively, which are actuated by the controller 102.

When the enclosure 30 precesses such that the piston 126 of fluid cylinder 122A retracts, fluid flows from the piston side of the fluid cylinder 122A through the lockout valve 130. A portion of the fluid exiting the fluid cylinder 122 flows through a bypass line 162A to the rod side of the fluid cylinder 122A. The rod side of the cylinder is unable to accommodate all of the fluid exiting the piston side of the cylinder due to the volume of the rod 128. Therefore, a portion of the fluid flows into port P of the main valve 152. From the main valve 152, the fluid exits port A, flows through the check valve 154, which prevents backflow into the manifold 150 and through line 160B to the lockout valve 130B on the piston side of the fluid cylinder 122B. When the enclosure 30 precesses in the opposite direction, the fluid flow reverses.

The accumulators 158 provide additional capacity in case the fluid expands due to heat, or due to imbalance of the fluid flow. The heating or imbalance of the fluid flow will create a higher pressure in the main valve 152, which in turn will cause any excess fluid to flow via ports A and T into the accumulators 158. Because ports A and T are on the low pressure side of the main valve, the cycling of fluid into and out of the accumulators is minimized.

Figure 10:
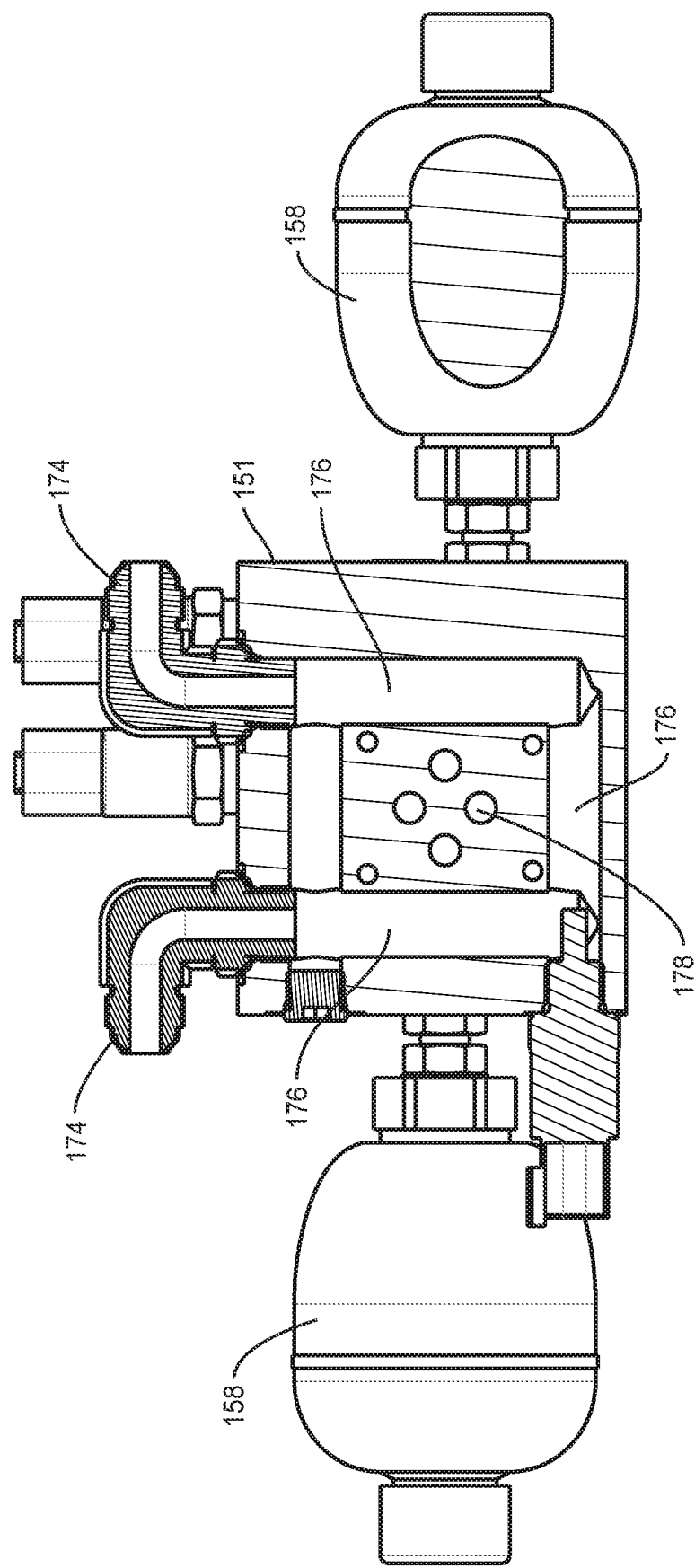
FIG. 10 is a section view of the manifold for the braking system.

In some embodiments, a cooling circuit 170 can be provided to dissipate heat generated by the movement of fluid through the manifold 150. A coolant source 172 connects to two coolant ports 174 on the manifold 150. The coolant ports 174, in turn connect to coolant passages 176 inside the manifold block 151 as shown in FIG. 10. The coolant passages 176 closely surround the fluid passages 178 connecting to ports A, B, P and T of the main valve 152 to dissipate the heat generated by the fluid flow through the main valve 152.

The design of the fluid flow path minimizes the amount of fluid that needs to flow through the main valve 152, which reduces the overall resistance due to fluid flow. The bypass lines 162A and 162B provide a very short fluid flow path between the piston side and rod side of the fluid cylinders 122A and 122B for a majority of the fluid flow without having the pass through the manifold assembly 150. Thus, only a small fluid flow needs to pass through the longer lines 160A and 160B. As a result, the frictional losses due to the fluid flow are greatly reduced, which in turn allows greater acceleration in the rate of precession so that the CMG 10 responds more quickly to the roll motion caused by a wave.

The solenoids 132 on the lockout valve 130 and the solenoid 134 on the main valve 152 provide a mechanism to lock the enclosure 30 to prevent precession of the enclosure 30. The lockout valves 130 and main valve 152 are biased to a locked position and the solenoid valves 132 and 134 are actuated to unlock the valves 130, 152. In the locked position, fluid flow through the lockout valve 130 and main valve 152 is prevented, which prevents precession of the enclosure 130. Normally, the enclosure 30 is locked when the flywheel 142 is spinning up to minimize bearing friction. When the flywheel 142 reaches a predetermined speed, the lockout valves 130 and main valve 152 are unlocked. The time it takes to reach the predetermined speed is referred to as the time to engage and is an important consideration for consumer enjoyment. Preferably, a low time to engage is desired so that the benefits of roll reduction are realized sooner.

The combination of the increased precession of the enclosure 30 and the faster rate of precession allows more counter torque to be generated more quickly by the CMG 10 as compared to prior art designs. It has been estimated that the peak roll torque can be increased by 5-10% due to the improvements of the braking system 110.

Figure 11:
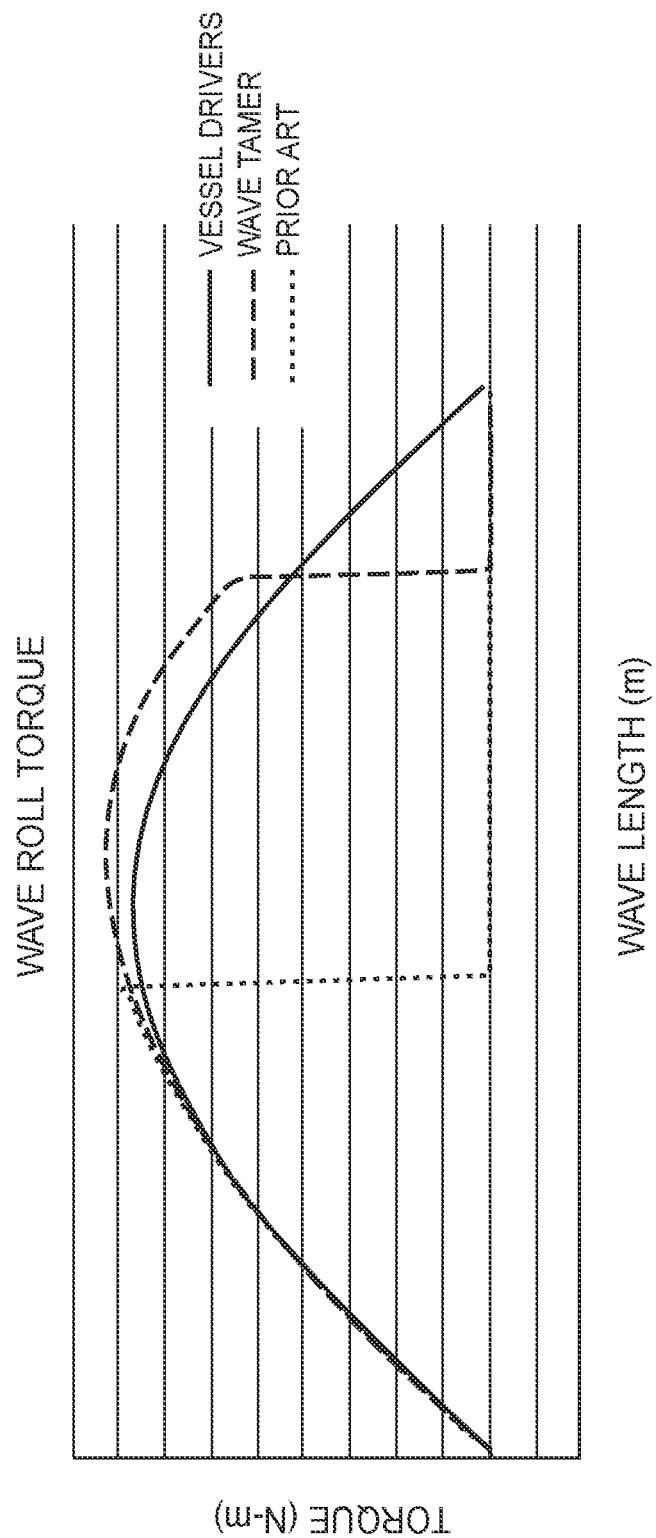
FIG. 11 is a graph of the roll resistance to a large rolling wave of a boat roll stabilizer. as herein described compared to the roll resistance of a conventional boat roll stabilizer.
Figure 12:
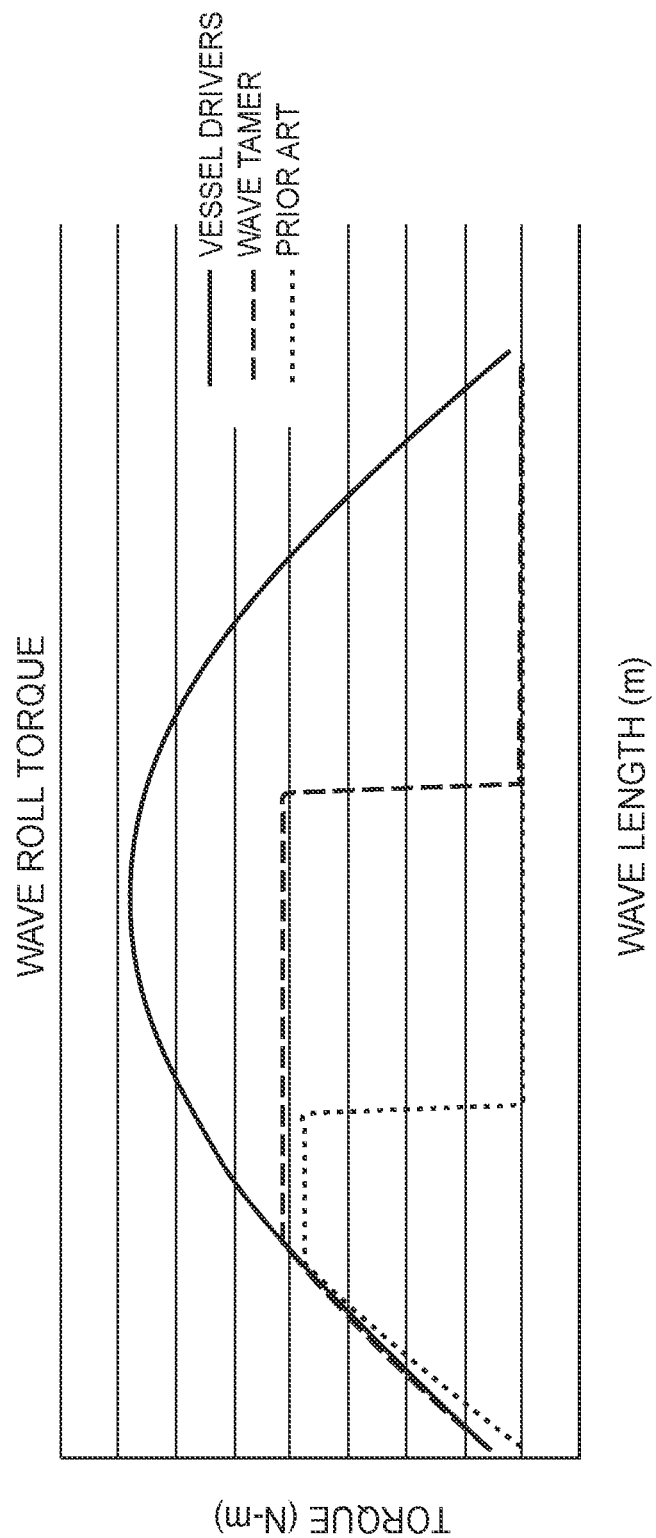
FIG. 12 is a graph of the roll resistance to a large short wave of a boat roll stabilizer. as herein described compared to the roll resistance of a conventional boat roll stabilizer.

FIGS. 11 and 12 illustrate how the improvements of the braking system translate to roll reduction. FIGS. 11 and 12 graphically illustrate the estimated roll resistance for the CMG 10 as herein described with the roll resistance of a similar prior art design for a large rolling wave (FIG. 9) and a large short wave (FIG. 10).

What is claimed is:

1. A gyroscopic boat roll stabilizer configured to be installed in a boat, comprising:
    a gimbal including a support frame and an enclosure, the enclosure configured to precess by rotating about a gimbal axis;
    a flywheel assembly rotatably mounted inside the enclosure for generating a torque that is applied to counter a rolling motion of the boat;
    a braking system for controlling precession of the enclosure, the braking system comprising:
        a first actuator connected between the support frame and the enclosure and comprising a fluid cylinder configured to resist precession of the enclosure about the gimbal axis; the cylinder having a first port and a second port;
        a manifold in fluid communication with the cylinder and operative to control the cylinder's resistance to precession of the enclosure;
        a hydraulic accumulator in fluid communication with the cylinder and disposed on a low pressure side of the manifold;
        a valve mounted so as to move with the cylinder as the enclosure rotates about the gimbal axis, the valve disposed in a fluid flow path between the first port and the second port of the cylinder and operative to control fluid flow between the first port and the second port of the cylinder.

2. The gyroscopic boat roll stabilizer of claim 1, wherein a housing of the valve is mounted to a housing of the cylinder so that the valve moves with the cylinder as the enclosure rotates about the gimbal axis.

3. The gyroscopic boat roll stabilizer of claim 1, wherein the manifold comprises coolant passages configured to carry coolant to dissipate heat generated by fluid flow through the manifold.

4. The gyroscopic boat roll stabilizer of claim 3, further comprising a cooling circuit configured to dissipate heat generated by fluid flow through the manifold; wherein the coolant passages form a portion of the cooling circuit.

5. The gyroscopic boat roll stabilizer of claim 1:
    wherein the first actuator is configured to resist rotation of the enclosure about the gimbal axis in a first direction;
    wherein the braking system further comprises a second actuator connected between the support frame and the enclosure and configured to resist rotation of the enclosure about the gimbal axis in a second direction opposite the first direction.

6. A method of operating a gyroscopic boat roll stabilizer installed in a boat, the gyroscopic boat roll stabilizer comprising a) a gimbal including a support frame and an enclosure, the enclosure configured to precess by rotating about a gimbal axis; and b) a flywheel assembly rotatably mounted inside the enclosure; method comprising:
    controlling precession of the enclosure about the gimbal axis via a hydraulic system by controlling hydraulic fluid flow between a first port of an actuator cylinder and a second port of the actuator cylinder via a valve;
    wherein the valve is mounted so as to move with the actuator cylinder as the enclosure rotates about the gimbal axis;
    accommodating changes in volume of the hydraulic fluid via a hydraulic accumulator disposed in fluid communication with the actuator cylinder and disposed on a low pressure side of a manifold through which the hydraulic fluid flows when the enclosure is precessing.

7. The method of claim 6, wherein, when the valve is closed, fluid flow between the first and second ports of the actuator cylinder is inhibited.

8. The method of claim 6:
    wherein the actuator cylinder is a first actuator cylinder, and
    wherein the hydraulic system further comprises a second actuator cylinder;
    wherein the controlling the precession comprises controlling the precession via the first and second actuator cylinders.

9. The method of claim 6, further comprising removing heat from the manifold by routing cooling fluid through cooling passages in the manifold.

10. The method of claim 6, wherein a housing of the valve is integrally formed with a housing of the actuator cylinder.

11. A gyroscopic boat roll stabilizer configured to be installed in a boat, comprising:
    a gimbal including a support frame and an enclosure;
    a flywheel assembly rotatably mounted inside the enclosure for generating a torque that is applied to counter a rolling motion of the boat; wherein the flywheel assembly and the enclosure are configured such that precession of the flywheel assembly causes the enclosure to rotate about a gimbal axis;
    a braking system for controlling precession of the enclosure, the braking system comprising:
        a first actuator connected between the support frame and the enclosure and comprising a fluid cylinder configured to resist precession of the enclosure about the gimbal axis; the cylinder having a piston side port and a rod side port;
        a hydraulic circuit providing a fluid flow path between the piston side port and the rod side port; the hydraulic circuit comprising a valve mounted so as to move with the cylinder as the enclosure rotates about the gimbal axis, the valve disposed in the fluid flow path and operative to control fluid flow between the piston side port and the rod side port of the cylinder;
        wherein the hydraulic circuit further comprises a manifold and a hydraulic accumulator in fluid communication with the cylinder and disposed on a low pressure side of the manifold.

12. The gyroscopic boat roll stabilizer of claim 11, wherein a housing of the valve is mounted to a housing of the cylinder so that the valve moves with the cylinder as the enclosure rotates about the gimbal axis.

13. The gyroscopic boat roll stabilizer of claim 11, wherein the manifold comprises coolant passages configured to carry coolant to dissipate heat generated by fluid flow through the manifold.

14. The gyroscopic boat roll stabilizer of claim 13, further comprising a cooling circuit configured to dissipate heat generated by fluid flow through the manifold; wherein the coolant passages form a portion of the cooling circuit.

15. The gyroscopic boat roll stabilizer of claim 11:
    wherein the first actuator is configured to resist rotation of the enclosure about the gimbal axis in a first direction;

wherein the braking system further comprises a second actuator connected between the support frame and the enclosure and configured to resist rotation of the enclosure about the gimbal axis in a second direction opposite the first direction.

* * * * *